(12) United States Patent
Maki et al.

(10) Patent No.: US 9,328,824 B2
(45) Date of Patent: May 3, 2016

(54) CYLINDER MEMBER OF AUTOMATIC TRANSMISSION AND MANUFACTURING METHOD THEREOF

(71) Applicant: AISIN AW CO., LTD., Anjo-shi, Aichi-ken (JP)

(72) Inventors: Masayuki Maki, Nisshin (JP); Takaaki Kawashima, Anjo (JP)

(73) Assignee: AISIN AW CO., LTD., Aichi-ken (JP)

( * ) Notice: Subject to any disclaimer, the term of this patent is extended or adjusted under 35 U.S.C. 154(b) by 548 days.

(21) Appl. No.: 13/767,491

(22) Filed: Feb. 14, 2013

(65) Prior Publication Data

US 2013/0247752 A1 Sep. 26, 2013

(30) Foreign Application Priority Data

Mar. 23, 2012 (JP) ................................. 2012-066481

(51) Int. Cl.
| | |
|---|---|
| *B21D 22/26* | (2006.01) |
| *F16J 10/02* | (2006.01) |
| *B21D 22/24* | (2006.01) |
| *B21K 1/76* | (2006.01) |
| *B21D 22/30* | (2006.01) |

(52) U.S. Cl.
CPC .................. *F16J 10/02* (2013.01); *B21D 22/24* (2013.01); *B21D 22/26* (2013.01); *B21K 1/76* (2013.01); *B21D 22/30* (2013.01); *Y10T 29/4927* (2015.01)

(58) Field of Classification Search
CPC ...... B21D 22/20; B21D 22/22; B21D 22/225; B21D 22/24; B21D 22/26; B21D 22/30; B21D 24/04; B21K 1/26; B21K 1/76; B21K 3/00; F16J 10/02; Y10T 29/4927
See application file for complete search history.

(56) References Cited

U.S. PATENT DOCUMENTS

| | | | | |
|---|---|---|---|---|
| 192,448 | A * | 6/1877 | Morgan et al. | ......... B21D 22/30 72/347 |
| 1,272,751 | A * | 7/1918 | Winter | ................... B21D 22/30 72/347 |
| 5,125,256 | A * | 6/1992 | Ohkubo | ................. B21D 53/16 29/893.34 |
| 5,727,885 | A | 3/1998 | Ono et al. | |
| 5,761,949 | A * | 6/1998 | Dalessandro | .......... B21D 22/24 72/325 |
| 8,875,555 | B2 * | 11/2014 | Iwata | .................... B21C 23/186 72/327 |
| 2004/0016281 | A1 * | 1/2004 | Schwager | ................ B21K 1/30 72/355.6 |
| 2007/0125147 | A1 * | 6/2007 | Hodjat | ................. B21D 53/261 72/348 |
| 2013/0228001 | A1 * | 9/2013 | Nakamura | ............. B21D 11/20 72/348 |

FOREIGN PATENT DOCUMENTS

| | | | | |
|---|---|---|---|---|
| DE | 10209754 | A1 * | 9/2003 | ................ F01L 1/08 |
| JP | 2-84058 | U | 6/1990 | |
| JP | 9-210064 | A | 8/1997 | |

(Continued)

*Primary Examiner* — Edward Tolan
(74) *Attorney, Agent, or Firm* — Sughrue Mion, PLLC

(57) ABSTRACT

A cylinder member of an automatic transmission that includes an outer peripheral introducing portion having a shape that is able to be formed by ironing without forming and trimming of a flange portion which was conventionally required for forming an outer peripheral introducing portion. Therefore, steps required for forming the flange portion are omitted, and the number of steps for manufacturing the cylinder member is reduced. Without using a large-scale press machine such as a progressive press and a transfer press, the cylinder member is manufactured by a smaller-sized press machine, thereby reducing equipment investment required for manufacturing the cylinder member.

8 Claims, 16 Drawing Sheets

(56) References Cited

FOREIGN PATENT DOCUMENTS

| JP | 11-141661 A | 5/1999 |
| JP | 2000-254735 A | 9/2000 |
| JP | 2012-002263 A | 1/2012 |

* cited by examiner

F I G . 9
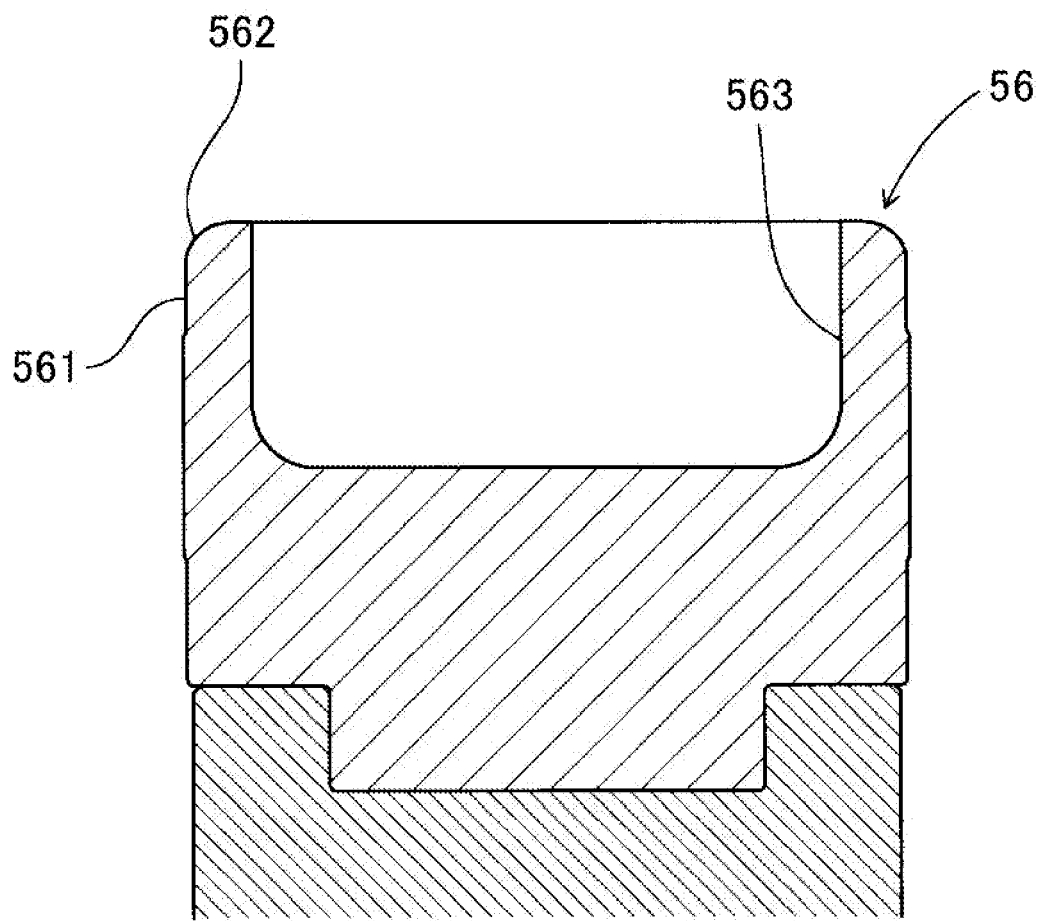

F I G . 15A
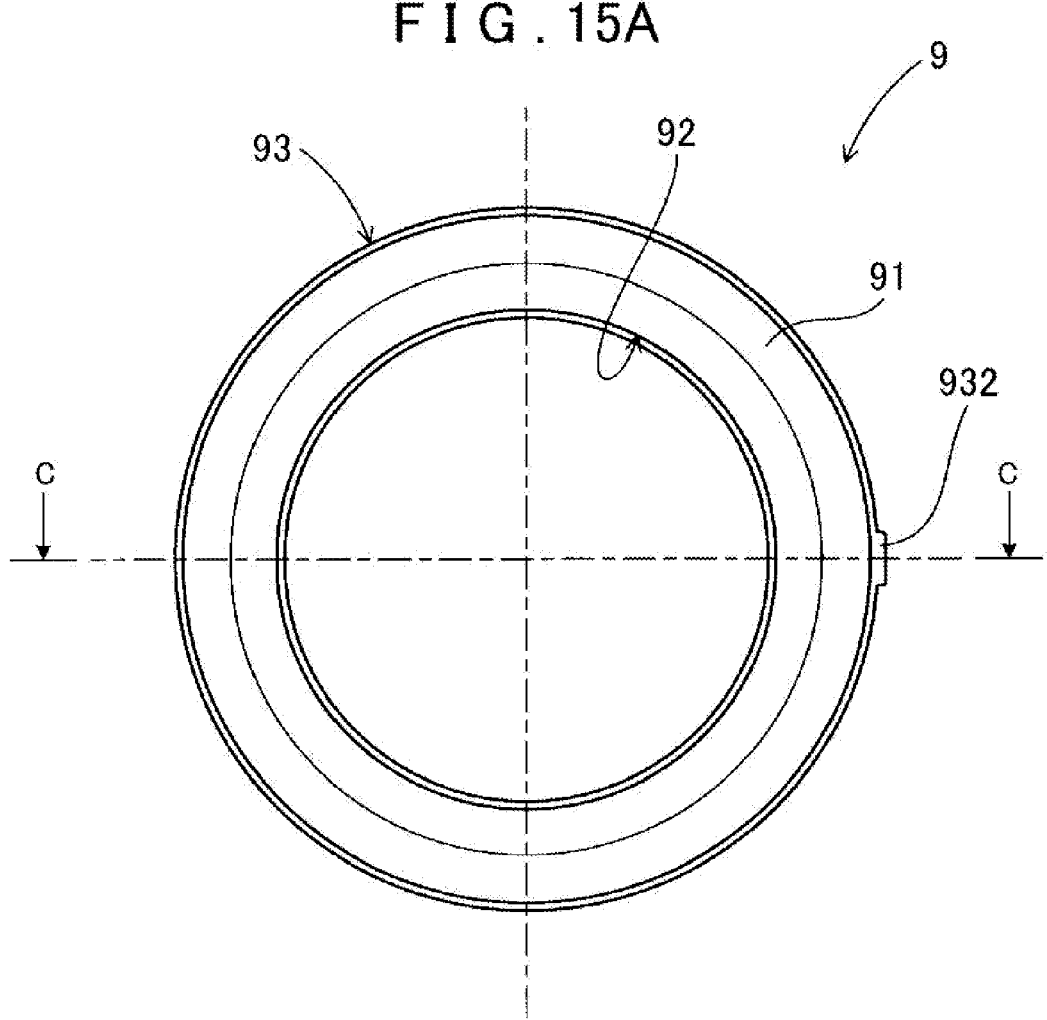
F I G . 15B
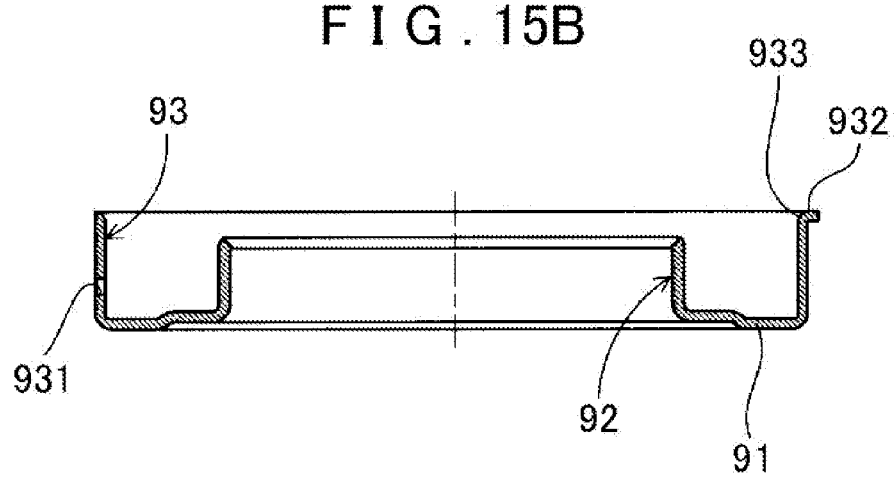

CYLINDER MEMBER OF AUTOMATIC TRANSMISSION AND MANUFACTURING METHOD THEREOF

INCORPORATION BY REFERENCE

The disclosure of Japanese Patent Application No. 2012-066481 filed on Mar. 23, 2012 including the specification, drawings and abstract is incorporated herein by reference in its entirety.

BACKGROUND OF THE INVENTION

The present invention relates to a cylinder member used in a brake mechanism of an automatic transmission, and a manufacturing method of the cylinder member.

DESCRIPTION OF THE RELATED ART

An automatic transmission or the like in a vehicle is provided with a brake mechanism which switches a plurality of rotors included in a speed change gear mechanism to a rotating or stopped state (see Japanese Patent Application Publication No. 2012-2263 (JP 2012-2263 A).

The brake mechanism includes a plurality of friction plates, an annular piston which presses the friction plates, and a cylinder member slidably accommodating the piston. The brake mechanism is configured so as to generate a braking force by feeding a lubricating oil for the automatic transmission to an inner side of the cylinder member, sliding the piston by using a hydraulic pressure thus generated, and pressing the friction plates.

As illustrated in FIG. 15A and FIG. 15B, the cylinder member 9 includes an annular bottom face portion 91, a cylindrical inner peripheral wall portion 92 projecting upright from an inner peripheral edge of the bottom face portion 91, and a cylindrical outer peripheral wall portion 93 projecting upright from an outer peripheral edge of the bottom face portion 91. The outer peripheral wall portion 93 has a through hole 931 from which a lubricating oil is fed to an inner side of the cylinder member 9, a positioning claw portion 932 projecting upright from a distal end portion of the outer peripheral wall portion 93 to an outer peripheral side, and an outer peripheral introducing portion 933 formed by increasing an inner diameter of the distal end portion of the outer peripheral wall portion 93.

As shown in FIG. 16A and FIG. 16B, after a flange portion 930 is formed by bending the distal end portion of the outer peripheral wall portion 93 to the outer peripheral side, the flange portion 930 is trimmed off while leaving a part that is to be formed into the positioning claw portion 932, thereby forming the positioning claw portion 932 and the outer peripheral introducing portion 933. A shape of the outer peripheral introducing portion 933 thus formed is made of a bent portion which connects the flange portion 930 with the outer peripheral wall portion 93.

SUMMARY OF THE INVENTION

However, the above-described cylinder member 9 has the following problems.

In order to manufacture the cylinder member 9, it is required to form and trim off the flange portion 930 to form the positioning claw portion 932 and the outer peripheral introducing portion 933, in addition to forming of the bottom face portion 91, the outer peripheral wall portion 93, and the inner peripheral wall portion 92. Therefore, the number of steps for manufacturing the cylinder member 9 is increased.

When a number of steps are required for manufacturing the foregoing cylinder member 9 as stated above, a large-scale press machine such as a progressive press and a transfer press having a plurality of steps is used. Such a large-scale press machine is expensive, and a large equipment investment will thus be needed for manufacturing the cylinder member 9.

Also, when cutting off the flange portion 930, the outer peripheral wall portion 93 may be deformed, thus deteriorating diametric accuracy thereof. Conventionally, in order to ensure the diametric accuracy of the outer peripheral wall portion 93, after the flange portion 930 is trimmed off, a shape of the outer peripheral wall portion 93 is modified, thereby causing a further increase of the number of steps. Due to this, the equipment investment is increased further, and production efficiency is reduced.

The present invention has been accomplished in view of the above-mentioned problems, and an object of the present invention is to provide a cylinder member of an automatic transmission, which has high diametrical accuracy and enables reduction of the number of steps and downsizing of a press machine, and a manufacturing method of the cylinder member.

An aspect of the present invention is a cylinder member of an automatic transmission, wherein: the cylinder member is formed by a press working and includes an annular bottom face portion, a cylindrical inner peripheral wall portion projecting upright from an inner peripheral edge of the bottom face portion, and a cylindrical outer peripheral wall portion projecting upright from an outer peripheral edge of the bottom face portion; the inner peripheral wall portion has an inner peripheral constant portion having a constant outer diameter, and has an inner peripheral introducing portion on a distal end of the inner peripheral wall portion, the inner peripheral introducing portion having an outer diameter smaller than the outer diameter of the inner peripheral constant portion; the outer peripheral wall portion has an outer peripheral constant portion having a constant inner diameter, and has an outer peripheral introducing portion on a distal end of the outer peripheral wall portion, the outer peripheral introducing portion having an inner diameter larger than the inner diameter of the outer peripheral constant portion; the outer peripheral constant portion has a through hole that communicates between an inner peripheral side and an outer peripheral side; a positioning claw portion is provided at least one position of the outer peripheral introducing portion in a circumferential direction and projects to the outer peripheral side; and the outer peripheral introducing portion includes a diameter-increased straight portion having a constant inner diameter that is larger than the inner diameter of the outer peripheral constant portion, and a diameter changing portion which smoothly connects the diameter-increased straight portion with the outer peripheral constant portion.

Another aspect of the present invention is a manufacturing method of a cylinder member of an automatic transmission, wherein the cylinder member includes an annular bottom face portion, a cylindrical inner peripheral wall portion projecting upright from an inner peripheral edge of the bottom face portion, and a cylindrical outer peripheral wall portion projecting upright from an outer peripheral edge of the bottom face portion, the inner peripheral wall portion has an inner peripheral constant portion having a constant outer diameter, and has an inner peripheral introducing portion on a distal end of the inner peripheral wall portion, the inner peripheral introducing portion having an outer diameter smaller than the outer diameter of the inner peripheral constant portion, the outer peripheral wall portion has an outer peripheral constant portion having a constant inner diameter, and has an outer peripheral introducing portion on a distal end of the outer peripheral wall portion, the outer peripheral introducing portion having an inner diameter larger than the inner diameter of the outer peripheral constant portion, the outer peripheral constant portion has a through hole that communicates between an inner peripheral side and an outer peripheral side, and a positioning claw portion is provided at least one position of the outer peripheral introducing portion in a circumferential direction and projects to the outer peripheral side. The manufacturing method includes: a drawing step in which a cylindrical preliminary outer peripheral wall portion is formed by projecting upright an outer peripheral side of an annular material; an outer peripheral wall portion ironing step in which ironing is carried out for forming the preliminary outer peripheral wall portion into the outer peripheral wall portion by an outer peripheral wall portion forming punch and an outer peripheral wall forming die, the outer peripheral wall portion forming punch having an outer peripheral wall portion forming surface provided on an outer peripheral surface of the outer peripheral wall portion forming punch and corresponding to an inner peripheral shape of the outer peripheral wall portion, and the outer peripheral wall forming die having an ironing hole corresponding an outer peripheral shape of the outer peripheral wall portion; an inner peripheral wall portion forming step in which the inner peripheral wall portion is formed by an inner peripheral wall portion forming punch and an inner peripheral wall portion forming die, the inner peripheral wall portion forming punch having an inner peripheral wall portion forming surface provided on an outer peripheral surface of the inner peripheral wall portion forming punch and corresponding to an inner peripheral shape of the inner peripheral wall portion, and the inner peripheral wall portion forming die having an inner peripheral wall portion forming hole corresponding to an outer peripheral shape of the inner peripheral wall portion; a punching step in which the through hole is formed by a piercing punch arranged at a position corresponding to the through hole, and a piercing die having a punched hole corresponding to the piercing punch; and a claw forming step in which the positioning claw portion is formed by a claw forming punch arranged at a position corresponding to the positioning claw portion on an inner peripheral side of the outer peripheral wall portion, and a claw forming die having a recessed portion corresponding to the claw forming punch. In the outer peripheral wall portion ironing step, the outer peripheral introducing portion is formed, the outer peripheral introducing portion including an diameter-increased straight portion having a constant inner diameter that is larger than the inner diameter of the outer peripheral constant portion, and an diameter changing portion which smoothly connects the diameter-increased straight portion and the outer peripheral constant portion.

The cylinder member of the automatic transmission includes the outer peripheral introducing portion which has an inner peripheral surface of the diameter-increased straight portion and the diameter changing portion configured as above. A shape of the outer peripheral introducing portion is able to be formed by ironing without forming and trimming of a flange portion which was conventionally required for forming an outer peripheral introducing portion. Therefore, steps required for forming the flange portion are omitted, and the number of steps for manufacturing the cylinder member is reduced. Hence, without using a large-scale press machine such as a progressive press and a transfer press, the cylinder member is manufactured by a smaller-sized press machine. Thus, equipment investment required for manufacturing the cylinder member is reduced.

Further, as described earlier, since trimming of the flange portion is not performed, deformation of the outer peripheral wall portion due to trimming of the flange portion is inhibited, thereby preventing deterioration of diametric accuracy of the outer peripheral wall portion. Hence, without modifying the shape of the outer peripheral wall portion, the outer peripheral wall portion is formed with high diametric accuracy, thereby improving productivity of the cylinder member.

The manufacturing method of the cylinder member of an automatic transmission includes the drawing step, the outer peripheral wall portion ironing step, the inner peripheral wall portion forming step, the punching step, and the claw forming step. Thus, the above-described excellent cylinder member of the automatic transmission is obtained easily.

As described so far, the cylinder member of the automatic transmission is provided, which has high diametric accuracy and enables reduction of the number of manufacturing steps and downsizing of a press machine. The cylinder member manufacturing method by which the cylinder member is easily obtained is also provided.

BRIEF DESCRIPTION OF THE DRAWINGS

FIG. 9 is an explanatory view showing an inner peripheral wall portion forming punch according to the first embodiment;

FIG. 15A is an explanatory view showing a cylinder member according to the related art, in which a flange portion is trimmed off, and FIG. 15B is a sectional view taken along the line indicated by arrows C-C)

DETAILED DESCRIPTION OF THE EMBODIMENTS

In the cylinder member of the automatic transmission, the inner peripheral introducing portion may be formed by a curved surface having a generally curved-surface section. In this case, the inner peripheral introducing portion is formed easily by barring, together with the inner peripheral wall portion.

The positioning claw portion may be formed by bending a part of a distal end portion of the diameter-increased straight portion to the outer peripheral side. In this case, the positioning claw portion is easily formed by a cutting and raising work.

In the foregoing manufacturing method of the cylinder member of the automatic transmission, the inner peripheral introducing portion may be formed by a curved surface having a generally arc-shaped section, the inner peripheral wall portion forming punch may have a punch curved surface portion corresponding to an inner peripheral shape of the inner peripheral introducing portion, the inner peripheral wall portion forming die may have a die curved surface portion corresponding to an outer peripheral shape of the inner peripheral introducing portion, and the inner peripheral introducing portion may be formed by barring in the inner peripheral wall portion forming step. In this case, by barring using the inner peripheral wall portion forming punch and the inner peripheral wall portion forming die configured as described above, the inner peripheral introducing portion is formed easily together with the inner peripheral wall portion.

The positioning claw portion may be formed by a cutting and raising work conducted by the claw forming punch and the claw forming die, in which a part of a distal end portion of the diameter-increased straight portion is bent to the outer peripheral side. In this case, the positioning claw portion is easily formed while reducing an influence of forming of the positioning claw portion on the diametric accuracy of the outer peripheral wall portion.

The through hole of the cylinder member may be formed in the outer peripheral constant portion on a side opposite to a side where the positioning claw portion projects, and the through hole may be formed by moving the piercing punch relative to the piercing die by using relative movement of the claw forming punch and the claw forming die when forming the positioning claw portion. In this case, the relative movement of the claw forming punch and the claw forming die, and the relative movement of the piercing punch and the piercing die are made by a single driving source. Accordingly, the equipment investment required for manufacturing the cylinder member is reduced.

First Embodiment

An example of a cylinder member of an automatic transmission will be explained with reference to FIG. 1 to FIG. 14.

Figure 1:
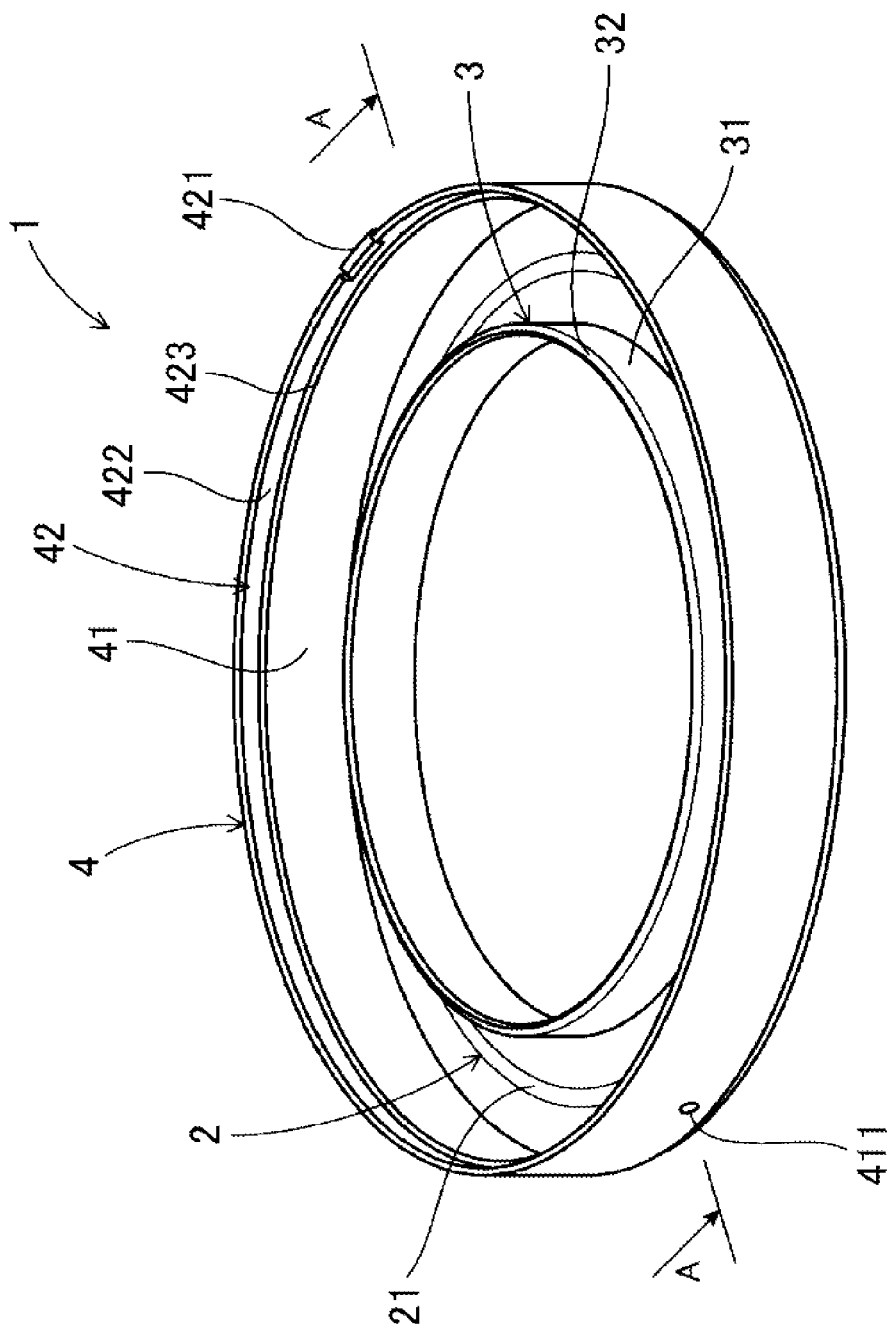
FIG. 1 is an explanatory view showing a cylinder member according to a first embodiment.
Figure 2A:
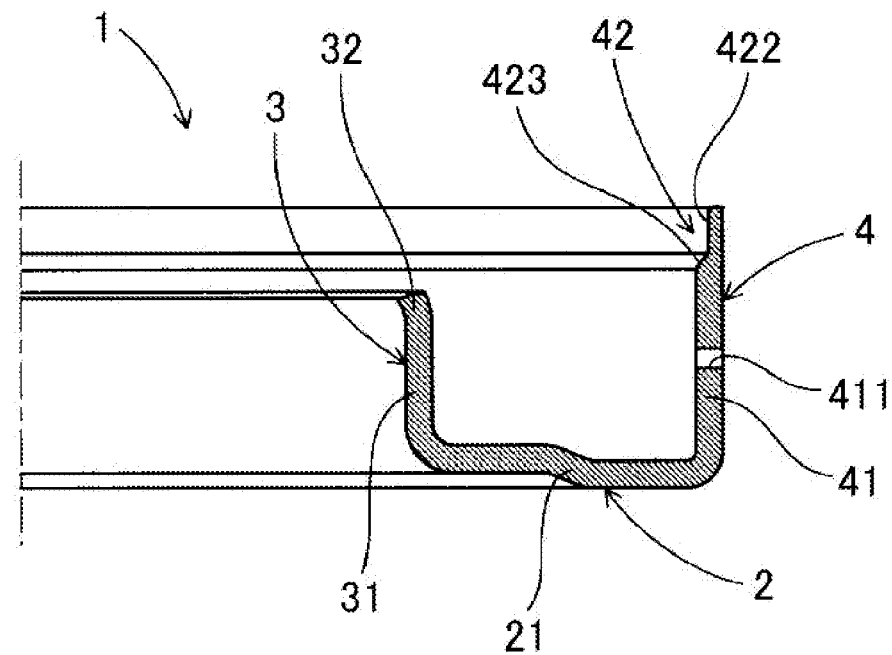
FIG. 2A is a partial sectional view taken along line A-A in FIG. 1 showing a through hole and a surrounding area.
Figure 2B:
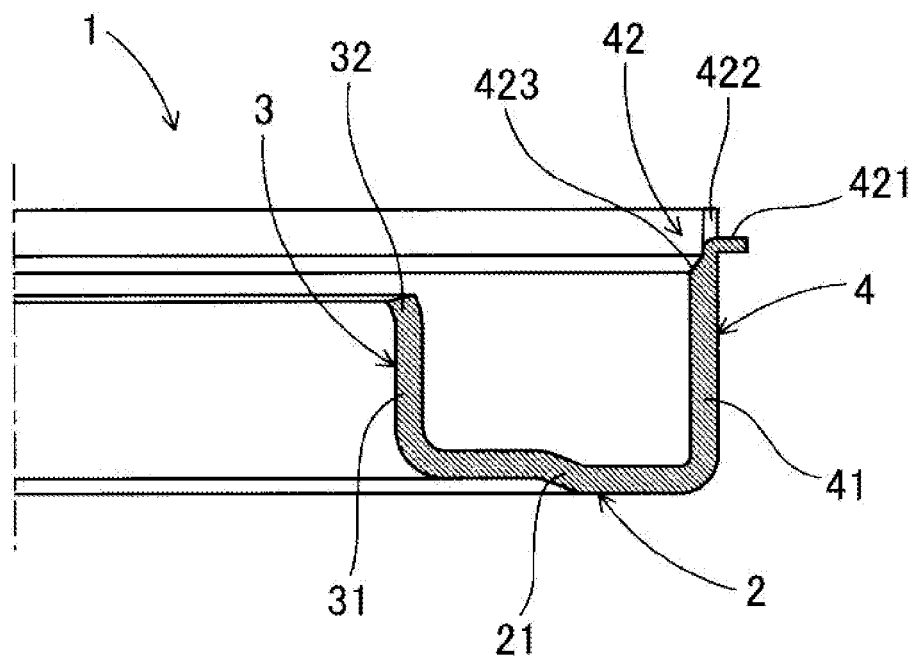
FIG. 2B is a partial sectional view taken along the line A-A in FIG. 1 showing a positioning claw portion and a surrounding area.

As illustrated in FIG. 1, FIG. 2A and FIG. 2B, a cylinder member 1 of an automatic transmission is formed by pres working, and includes an annular bottom face portion 2, a cylindrical inner peripheral wall portion 3 projecting upright from an inner peripheral edge of the bottom face portion 2, and a cylindrical outer peripheral wall portion 4 projecting upright from an outer peripheral edge of the bottom face portion 2.

As shown in FIG. 1, FIG. 2A and FIG. 2B, the inner peripheral wall portion 3 has an inner peripheral constant portion 31 having a constant outer diameter, and an inner peripheral introducing portion 32 which is provided on a distal end side of the inner peripheral wall portion 3 and has an outer diameter smaller than that of the inner peripheral constant portion 31. Also, the outer peripheral wall portion 4 has an outer peripheral constant portion 41 having a constant inner diameter, and an outer peripheral introducing portion 42 which is provided on a distal end side of the outer peripheral wall portion 4 and has an inner diameter larger than that of the outer peripheral constant portion 41.

As illustrated in FIG. 2A, the outer peripheral constant portion 41 is provided with a through hole 411 that communicates between an inner peripheral side and an outer peripheral side.

As illustrated in FIG. 2B, a positioning claw portion 421 is provided in the outer peripheral introducing portion 42 at one location in a circumferential direction, and the positioning claw portion 421 is formed by projecting a distal end portion of the outer peripheral introducing portion 42 to the outer peripheral side.

As shown in FIG. 2A, the outer peripheral introducing portion 42 is made of a diameter-increased straight portion 422 having a constant inner diameter that is larger than the inner diameter of the outer peripheral constant portion 41, and a diameter changing portion 423 which smoothly connects the diameter-increased straight portion 422 with the outer peripheral constant portion 41.

More details will be described below.

The cylinder member 1 illustrated in FIG. 1, FIG. 2A, and FIG. 2B constitutes a brake mechanism included in an automatic transmission.

The brake mechanism includes a plurality of friction plates, a piston which presses the friction plates, and the cylinder member 1 slidably accommodating the piston. The brake mechanism generates a hydraulic pressure by feeding a lubricating oil for the automatic transmission to a space between the cylinder member 1 and the piston, and slides the piston by using the hydraulic pressure. Then, the friction plates are pressed by the sliding piston, thereby generating a braking force.

As shown in FIG. 1, FIG. 2A, and FIG. 2B, the cylinder member 1 includes the annular bottom face portion 2, the inner peripheral wall portion 3 projecting upright from the inner peripheral edge of the bottom face portion 2, and the outer peripheral wall portion 4 projecting upright from the outer peripheral edge of the bottom face portion 2.

The bottom face portion 2 is annular disk-shaped, and has a step shape 21 in which an area adjacent to the inner peripheral edge of the bottom face portion 2 is raised in a direction in which the inner peripheral wall portion 3 is projected.

As depicted in FIG. 1, FIG. 2A, and FIG. 2B, the inner peripheral wall portion 3 projecting upright from the inner peripheral edge of the bottom face portion 2 has the inner peripheral constant portion 31 having a constant outer diameter, and also has the inner peripheral introducing portion 32 which is provided on the distal end side of the inner peripheral wall portion 3 and has an outer diameter that is smaller than that of the inner peripheral constant portion 31.

The inner peripheral constant portion 31 has a constant thickness, and is formed so that both of the outer diameter and inner diameter thereof are constant.

The inner peripheral introducing portion 32 in this embodiment has an inner diameter which is reduced toward the distal end side, and is formed by reducing a diameter of the entire distal end portion toward the distal end side.

As illustrated in FIG. 1, FIG. 2A, and FIG. 2B, the outer peripheral wall portion 4 projecting upright from the outer peripheral edge of the bottom face portion 2 has the outer peripheral constant portion 41 having a constant inner diameter, and also has the outer peripheral introducing portion 42 which is provided on a distal end side of the outer peripheral wall portion 4 and has an inner diameter that is larger than that of the outer peripheral constant portion 41.

The outer peripheral constant portion 41 has a constant thickness, and is formed so that both of the foregoing inner diameter and outer diameter thereof are constant.

As depicted in FIG. 2A, the through hole 411 is provided in the outer peripheral constant portion 41 and communicates between the inner peripheral side and the outer peripheral side. An lubricating oil for an automatic transmission is able to be fed to an inner side of the cylinder member 1 via the through hole 411.

As shown in FIG. 2A, the outer peripheral introducing portion 42 includes the diameter-increased straight portion 422 having a constant inner diameter that is larger than the inner diameter of the outer peripheral constant portion 41, and a diameter changing portion 423 which smoothly connects the diameter-increased straight portion 422 with the outer peripheral constant portion 41. The diameter changing portion 423 illustrated in this embodiment forms a tapered inclined surface, and portions that connect the inner peripheral surface of the diameter-increased straight portion 422 and an inner peripheral surface of the outer peripheral constant portion 41 with the inclined surface of the diameter changing portion 423 are formed by smooth curved surfaces.

Also, as illustrated in FIG. 2A and FIG. 2B, the outer diameter of the outer peripheral introducing portion 42 is equal to the outer diameter of the outer peripheral constant portion 41, and an outer peripheral surface of the outer peripheral wall portion 4 excluding the positioning claw portion 421 is formed to have a constant outer diameter.

As shown in FIG. 2B, the positioning claw portion 421 is provided in the outer peripheral introducing portion 42 at one location in the circumferential direction, and the positioning claw portion 421 projects to the outer peripheral side. The positioning claw portion 421 is formed by bending a part of a distal end portion of the diameter-increased straight portion 422 to the outer peripheral side. The positioning claw portion 421 is designed to position the through hole 411 at a position corresponding to a lubricating oil supply hole of the automatic transmission when the brake mechanism is assembled to the automatic transmission.

As illustrated in FIG. 1, in this embodiment, the through hole 411 and the positioning claw portion 421 are formed on the opposite sides by 180 degrees in the circumferential direction of the outer peripheral wall portion 4.

Next, a device for manufacturing the above-described cylinder member 1 will be described.

Figure 3:
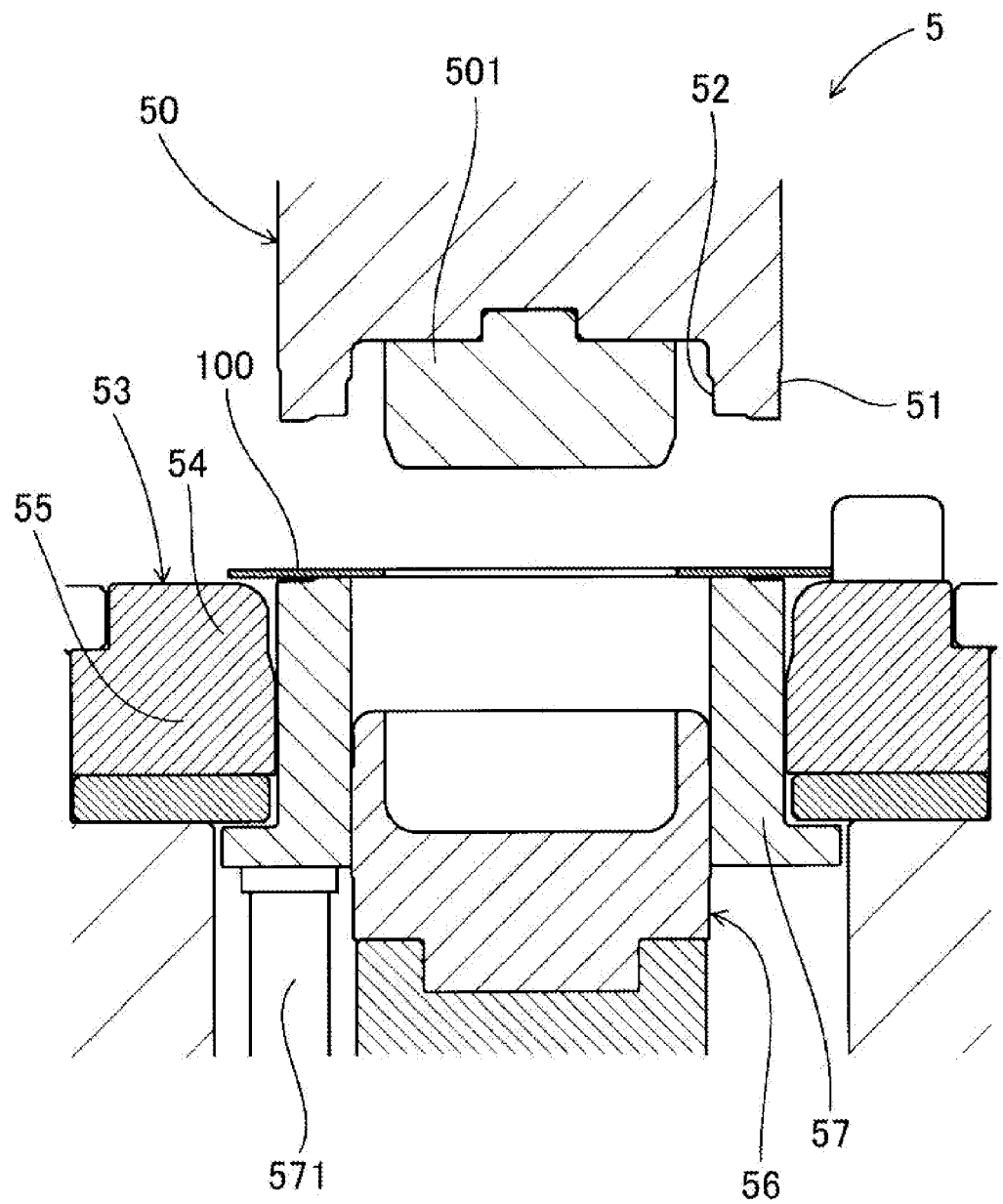
FIG. 3 is an explanatory view showing a first manufacturing device according to the first embodiment, on which a material is mounted.
Figure 11:
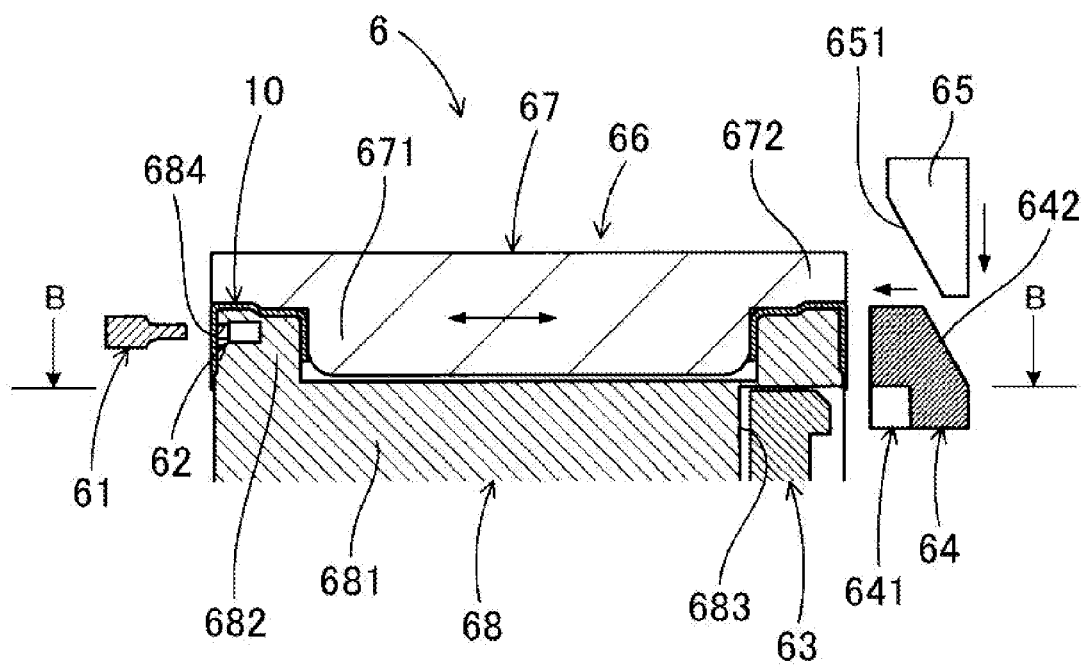
FIG. 11 is a sectional view showing a second manufacturing device according to the first embodiment.

In this embodiment, as illustrated in FIG. 3 and FIG. 11, the cylinder member 1 is manufactured by using a first manufacturing device 5 which forms the bottom face portion 2, the inner peripheral wall portion 3, and the outer peripheral wall portion 4, and a second manufacturing device 6 which forms the positioning claw portion 421 and the through hole 411.

As shown in FIG. 3, the first manufacturing device 5 includes an upper punch die 50 arranged on an upper side, a lower punch 57 arranged on a lower side of the upper punch die 50, and a combined die 53 which is integrally formed of a drawing die 54 for forming a cylindrical preliminary outer peripheral wall portion 40, and an outer peripheral wall portion forming die 55 for forming the outer periphery wall portion 4. The first manufacturing device 5 also includes an inner peripheral wall portion forming punch 56 and a single stroke press (not illustrated). The inner peripheral wall portion forming punch 56 has an inner peripheral wall portion forming surface 561 on an outer peripheral surface thereof, the inner peripheral wall portion forming surface 561 corresponding to an inner peripheral shape of the inner peripheral wall portion 3, and the single stroke press advances and retracts the upper punch die 50 along an axis line direction. The upper punch die 50, the lower punch 57, the drawing die 54, the combined die 53, and the inner wall portion forming punch 56 are arranged concentrically.

As illustrated in FIG. 3, the upper punch die 50 has a generally columnar shape and extends along the axis line direction, and a distal end portion thereof is formed into a cylindrical shape. Also, a base end portion of the upper punch die 50 is connected to an upper driving source (not illustrated) of the single stroke press, and is configured to be able to advance and retract along the axis line direction.

Figure 7:
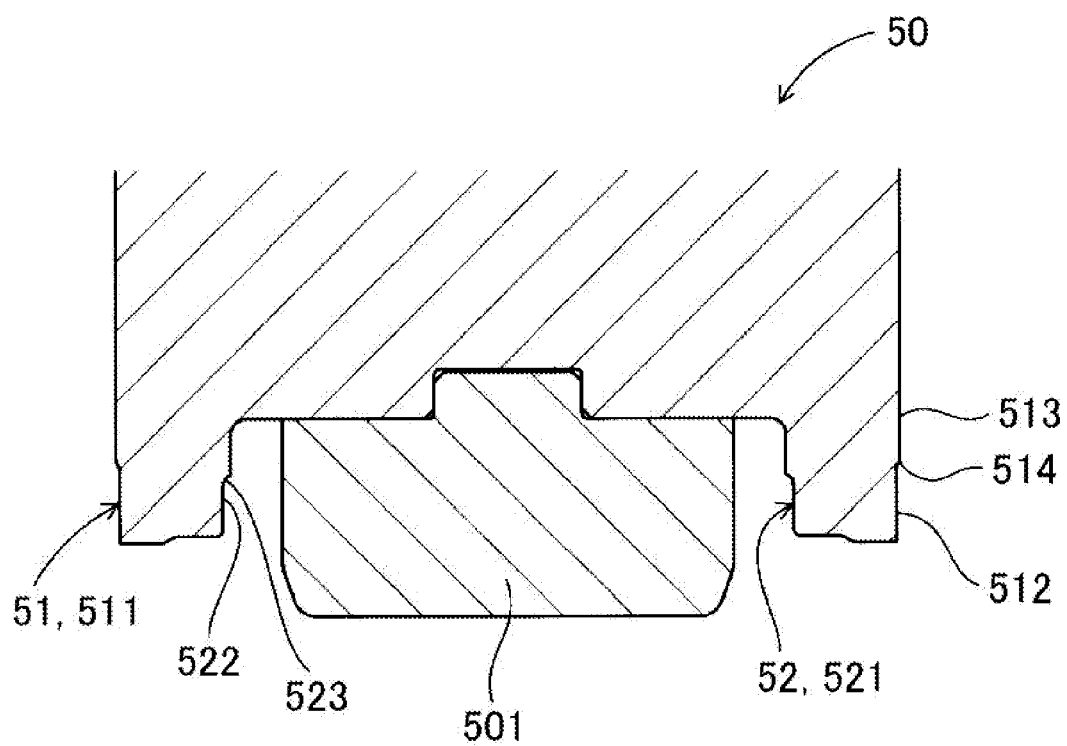
FIG. 7 is an explanatory view showing an upper punch die according to the first embodiment.

As depicted in FIG. 7, an outer peripheral surface of the distal end portion of the upper punch die 50 is an outer peripheral wall portion forming surface 511 corresponding to an inner peripheral shape of the outer peripheral wall portion 4, and constitutes an outer peripheral wall portion forming punch 51. Further, an inner peripheral surface of the distal end portion of the upper punch die 50 is an inner peripheral wall portion forming hole 521 corresponding to an outer peripheral shape of the inner peripheral wall portion 3, and constitutes an inner peripheral wall portion forming die 52.

A bottom surface of the distal end portion of the upper punch die 50 has a step shape corresponding to a shape of an outer peripheral side of the bottom face portion 2.

As shown in FIG. 7, the outer peripheral wall portion forming punch 51 configured of the outer side surface of the upper punch die 50 includes an outer peripheral small diameter portion 512, an outer peripheral large diameter portion 513, and a punch diameter changing portion 514. The outer peripheral small diameter portion 512 has a shape corresponding to an inner peripheral shape of the outer peripheral constant portion 41, the outer peripheral large diameter portion 513 is arranged on a base end side of the outer peripheral small diameter portion 512 and has a shape corresponding to an inner peripheral shape of the outer peripheral introducing portion 42, and the punch diameter changing portion 514 has a shape corresponding to the diameter changing portion 423. The punch diameter changing portion 514 is formed by an inclined surface and the diameter of the punch diameter changing portion 514 increases from the outer peripheral small diameter portion 512 side to the outer peripheral large diameter portion 513 side, and connecting portions of the outer peripheral small diameter portion 512 and the outer peripheral large diameter portion 513 with the punch diameter changing portion 514 are formed by smooth curved surfaces.

As shown in FIG. 7, the inner peripheral wall portion forming die 52 configured by the inner side surface of the upper punch die 50 includes an inner peripheral cylindrical portion 522 having a shape corresponding to an outer peripheral shape of the inner peripheral constant portion 31, and a die curved surface portion 523 which is arranged on a base end side of the inner peripheral cylindrical portion 522 and has a shape corresponding to an outer peripheral shape of the inner peripheral introducing portion 32. The die curved surface portion 523 is formed by a curved surface, and the diameter of the die curved surface portion 523 is reduced toward the base end side of the upper punch die 50.

As illustrated in FIG. 7, a columnar punch positioning portion 501 is arranged on an inner side of the cylindrical distal end portion of the upper punch die 50. By arranging the punch positioning portion 501 through an inner peripheral hole of an annular material 100 for forming the cylinder member 1 or through a positioning hole of the inner peripheral wall portion forming punch 56, positioning between the upper punch die 50 and the material 100 or the inner peripheral wall portion forming punch 56 is carried out.

As shown in FIG. 3, the lower punch 57 is arranged below the upper punch die 50. The lower punch 57 has a generally cylindrical shape arranged along the axis line direction. On an upper surface of the lower punch 57, a step shape corresponding to an inner side surface of the bottom face portion 2 is formed. Further, the lower punch 57 is connected to a lifting and lowering unit 571 which is able to advance and retract in the axis line direction.

As shown in FIG. 3, the combined die 53 that is integrally formed of the drawing die 54 and the outer peripheral wall forming die 55 is arranged on an outer peripheral side of the lower punch 57.

Figure 8:
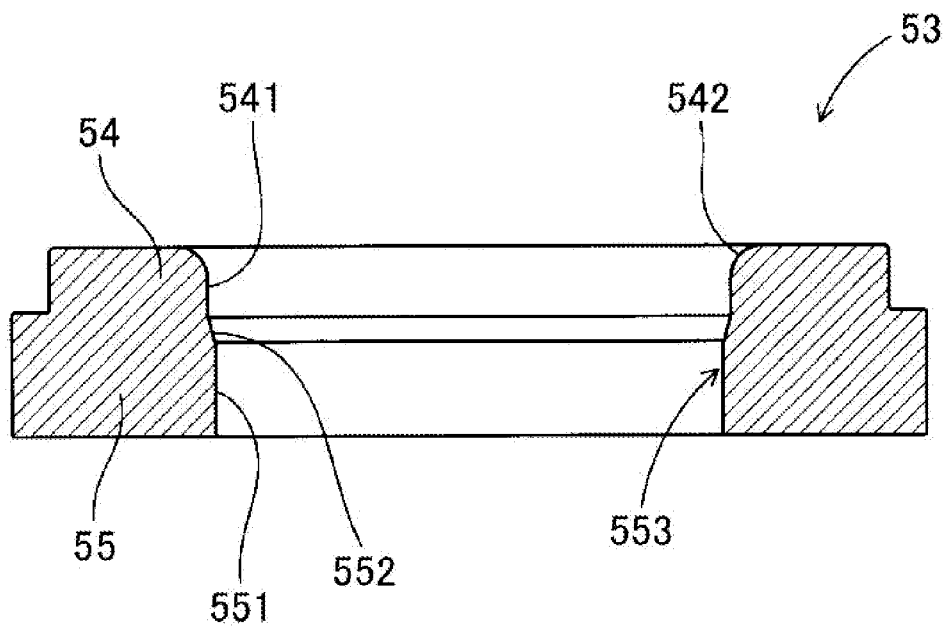
FIG. 8 is an explanatory view showing a combined die according to the first embodiment.

As illustrated in FIG. 8, the combined die 53 has a generally cylindrical shape and extends along the axis line direction, and an upper side thereof is the drawing die 54 and the lower side thereof is the outer peripheral wall portion forming die 55.

As depicted in FIG. 8, the drawing die 54 which forms an upper portion of the combined die 53 has a drawing hole 541 which is designed to form the preliminary outer peripheral wall portion 40 by projecting upright an outer peripheral side of the disk-shaped material 100. The drawing hole 541 has a fillet in an upper end edge portion 542 arranged on an upper end side of the drawing hole 541. An inner diameter of the drawing hole 541 is set to a value obtained by adding a predetermined clearance to an outer diameter of the outer peripheral wall portion 4 of the cylinder member 1. In this embodiment, the clearance is about 170% of a plate thickness.

As shown in FIG. 8, the outer peripheral wall portion forming die 55 which is a lower portion of the combined die 53 has an ironing hole 551, an inner peripheral surface of which performs ironing to form the preliminary outer peripheral wall portion 40. The ironing hole 551 includes an ironing introducing portion 552 formed by an inclined surface, and an ironing portion 553 arranged below the ironing introducing portion 552. The diameter of the ironing introducing portion 552 is reduced downwardly from a lower end of the drawing hole 541. An inner diameter of the ironing portion 553 is set so that the outer peripheral wall portion 4, which is formed by ironing conducted by the outer peripheral wall portion forming surface 511 and the ironing portion 553, has a desired outer diameter.

As illustrated in FIG. 3, the inner peripheral wall portion forming punch 56 is arranged on an inner peripheral side of the lower punch 57.

As shown in FIG. 9, the inner peripheral wall portion forming punch 56 forms the inner peripheral wall portion 3 by carrying out barring with the inner peripheral wall portion forming die 52. The inner peripheral wall portion forming punch 56 has a generally columnar shape, and an outer peripheral surface of the inner peripheral wall portion forming punch 56 is the inner peripheral wall portion forming surface 561 having a shape corresponding to the inner peripheral shape of the inner peripheral wall portion 3. A punch curved surface portion 562, which has a shape corresponding to a curved surface of an inner peripheral shape of the inner peripheral introducing portion 32, is formed in an outer peripheral edge portion at an upper end of the inner peripheral wall portion forming punch 56. A punch positioning hole 563, through which the punch positioning portion 501 is able to be arranged, is formed in a distal end portion of the inner peripheral wall portion forming punch 56.

Figure 12:
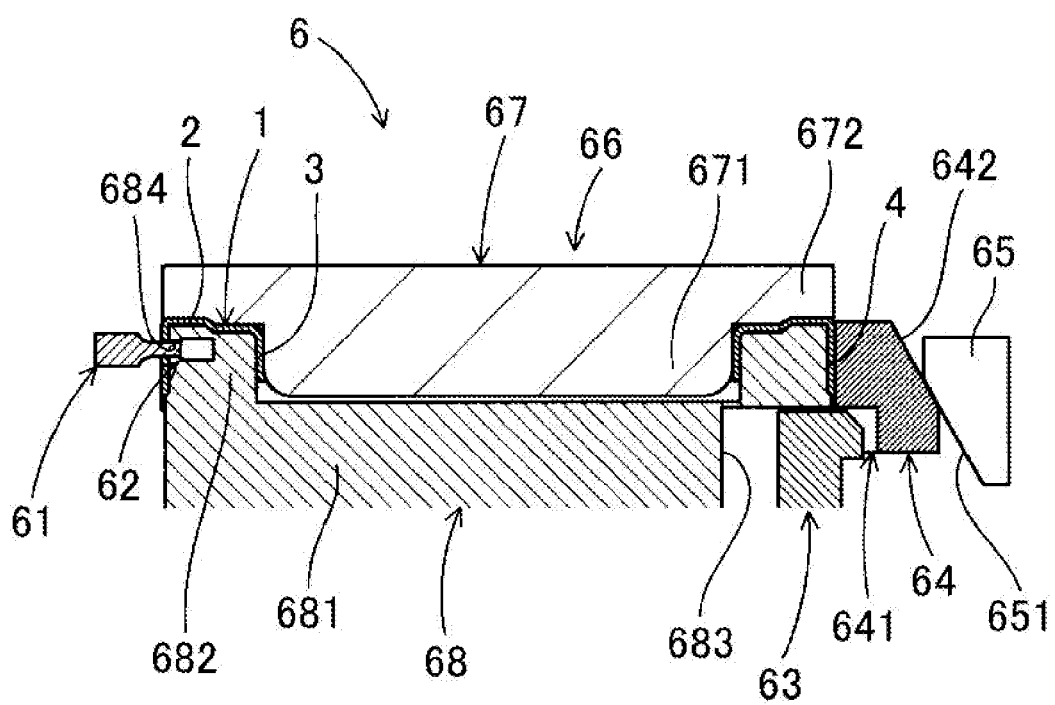
FIG. 12 is a sectional view showing the second manufacturing device according to the first embodiment, when a claw forming step and a punching step are completed.

As shown in FIG. 11 and FIG. 12, the second manufacturing device 6 includes a claw forming punch 63 and a claw forming die 64 that form the positioning claw portion 421, and a piercing punch 61 and a piercing die 62 that form the through hole 411 and are arranged on the opposite side of the claw forming punch 63 and the claw forming die 64 by 180 degrees. The second manufacturing device 6 also includes a holder unit 66 which holds a preliminary cylinder member 10 formed by the first manufacturing device 5, and a lifting and lowering unit (not illustrated) for moving the holder unit 66.

As shown in FIG. 11 and FIG. 12, the holder unit 66 is configured to reciprocate in a direction of a straight line which connects the claw forming punch 63 and the claw forming die 64 with the piercing punch 61 and the piercing die 62. The holder unit 66 has an upper unit 67 which holds the preliminary cylinder member 10 from above, and a lower unit 68 which holds the preliminary cylinder member 10 from below, and is configured to hold the preliminary cylinder member 10 between the upper unit 67 and the lower unit 68. In this embodiment, the holder unit 66 holds the cylinder member 10 so that an opening portion of the preliminary cylinder member 10 faces downward.

As shown in FIG. 11 and FIG. 12, the upper unit 67 includes a cylindrical projecting portion 671, and an annular unit flange portion 672 formed toward an outer peripheral side from an outer periphery of an upper end portion of the projecting portion 671. The projecting portion 671 has a shape corresponding to the inner peripheral shape of the inner peripheral wall portion 3, and is inserted in an inner side of the inner peripheral wall portion 3. Also, the unit flange portion 672 has a shape corresponding to an outer side shape of the bottom face portion 2, and presses the bottom face portion 2 from above.

As shown in FIG. 11 and FIG. 12, the lower unit 68 includes a columnar body portion 681, and a cylindrical inner side holding portion 682 projecting upwardly from an outer peripheral edge portion of an upper surface of the body portion 681.

On an outer peripheral surface of the body portion 681, a groove 683 which accommodates the claw forming punch 63 therein is formed and opens on the outer peripheral side.

The inner side holding portion 682 has a shape corresponding to an inner side shape of the preliminary cylinder member 10, and is arranged on an inner side of the preliminary cylinder member 10. Further, the inner side holding portion 682 has a punched hole 684 formed on the opposite side of the groove 683 by 180 degrees, and forms the piercing die 62 for forming the through hole 411.

Figure 13:
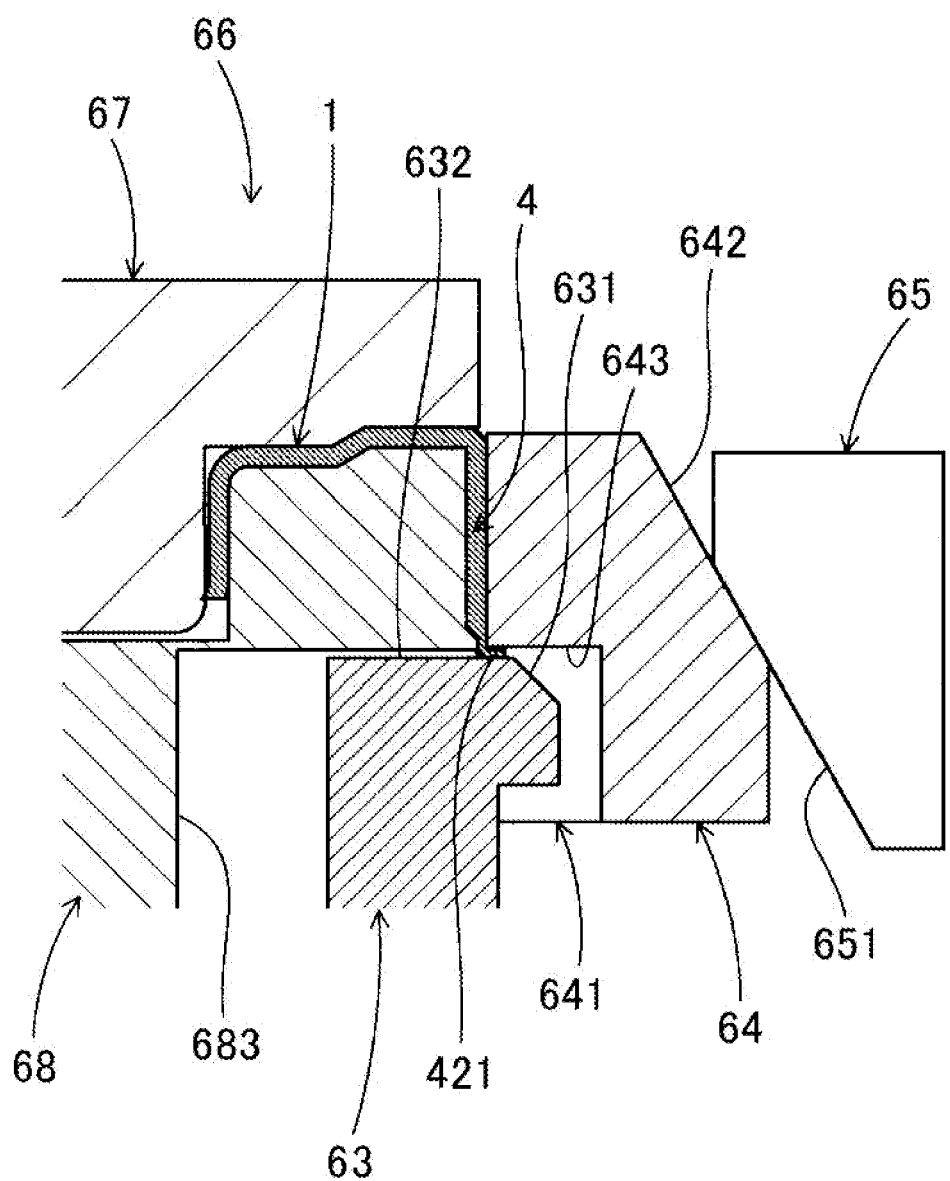
FIG. 13 is a partial enlarged view of FIG. 12.
Figure 14:
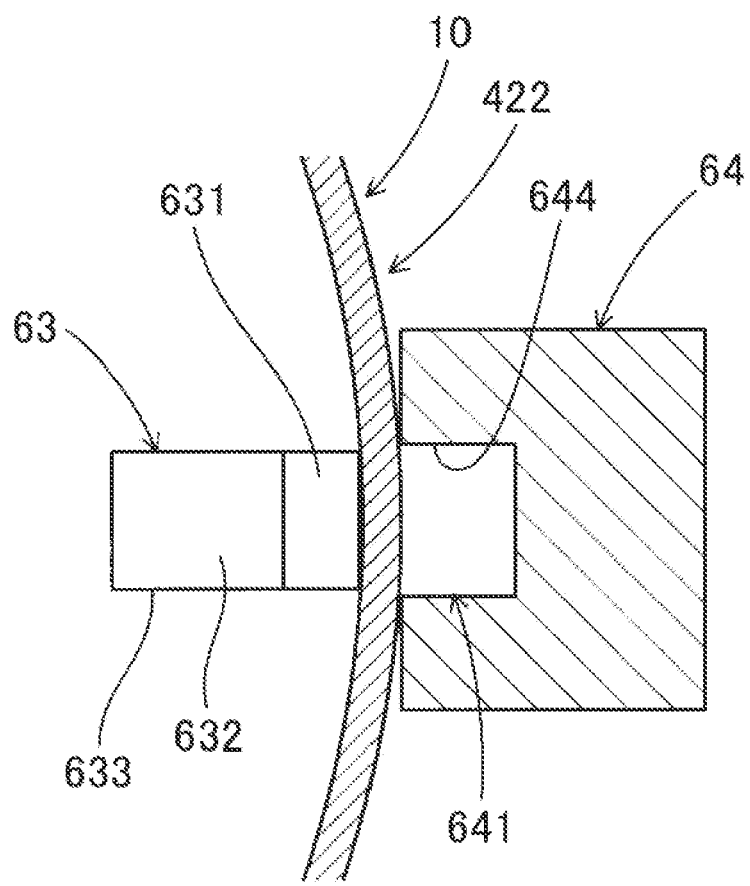
FIG. 14 is an explanatory view showing a claw forming punch and a claw forming die according to the first embodiment (equivalent to a sectional view taken along the line indicated by arrows B in FIG. 11)
Figure 16A:
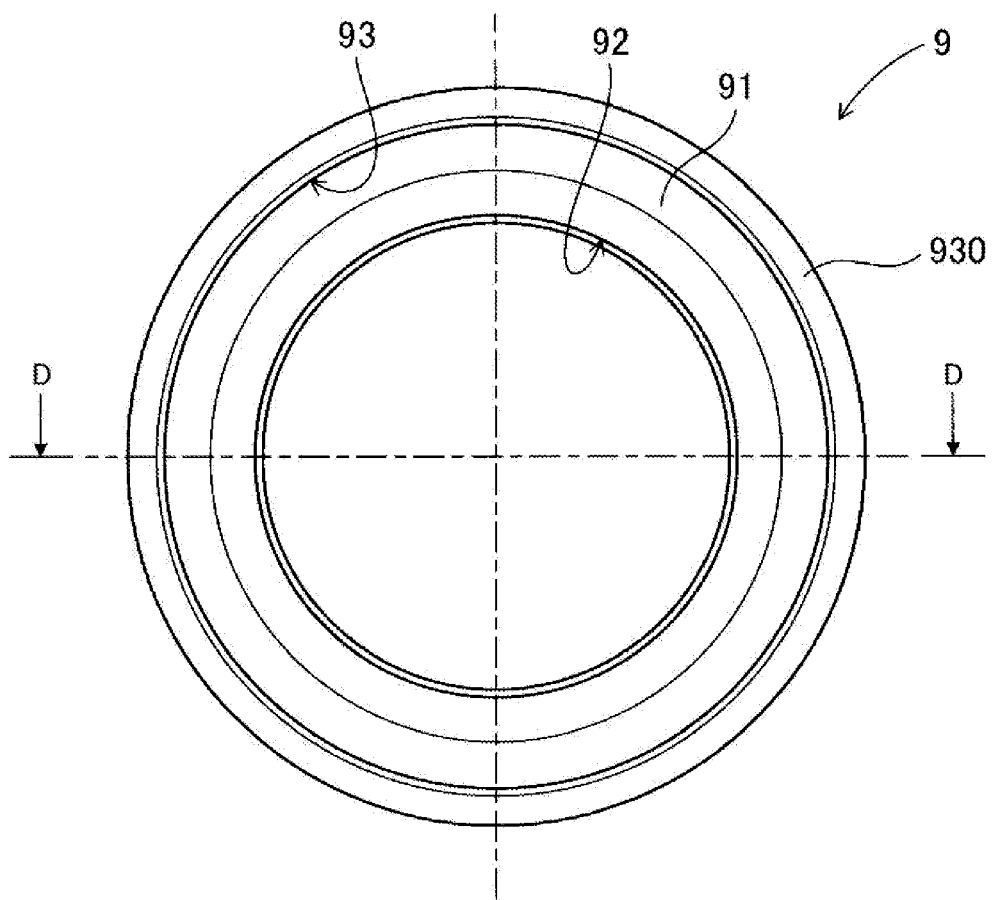
FIG. 16A is an explanatory view showing the cylinder member according to the related art, in which the flange portion is formed.
Figure 16B:
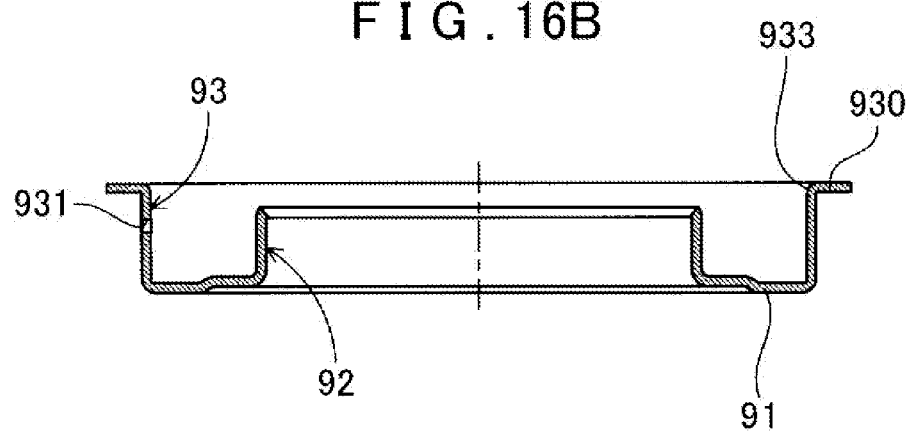
FIG. 16B is a sectional view taken along the line indicated by arrows D-D.

As shown in FIG. 13 and FIG. 14, the claw forming punch 63 arranged in the groove 683 of the lower unit 68 is fixed to the lifting and lowering unit (not shown), and is arranged so as to be movable relative to the holder unit 66. The claw forming punch 63 includes a claw forming introducing surface 631 formed by an inclined surface that is formed on a side where the groove 683 opens, a punch side claw forming surface 632 formed by a flat surface formed on an upper side of the claw forming punch 63, and punch side claw cutting surfaces 633 perpendicular to the punch side claw forming surface 632 and the claw forming introducing surface 631.

As shown in FIG. 11 and FIG. 12, the claw forming die 64 arranged to be movable toward the claw forming punch 63 is placed on a side where the groove 683 of the lower unit 68 opens. As illustrated in FIG. 13 and FIG. 14, at a location that faces the claw forming punch 63, the claw forming die 64 has a die recessed portion 641 into which the claw forming punch 63 is able to be inserted, and the claw forming die 64 also has a moving inclined surface 642 which faces upwards on the opposite side of the die recessed portion 641.

As shown in FIG. 11 and FIG. 12, a slide block 65 is arranged on an upper side of the moving inclined surface 642. The slide block 65 is connected to an upper driving source of the lifting and lowering unit so as to move up and down. In the slide block 65, a block side inclined surface 651 parallel to the moving inclined surface 642 is formed. When the slide block 65 moves down and presses the moving inclined surface 642 of the claw forming die 64 by the block side inclined surface 651, the claw forming die 64 moves toward the holder unit 66 along the block side inclined surface 651. The slide block 65 continues to move down after the claw forming die 64 is brought into contact with the preliminary cylinder member 10 held by the holder unit 66, whereby the holder unit 66 moves toward the piercing punch 61.

As shown in FIG. 13 and FIG. 14, the die recessed portion 641 has a die side claw forming surface 643 which faces the punch side claw forming surface 632, and a die side claw cutting surfaces 644 which face the punch side claw cutting surfaces 633.

A clearance between the punch side claw forming surface 632 and the die side claw forming surface 643 is set such that a bent portion is formed without cutting off the material arranged between the punch side claw forming surface 632 and the die side claw forming surface 643 when forming the positioning claw portion 421 by the claw forming punch 63 and the claw forming die 64.

A clearance between the punch side claw cutting surface 633 and the die side claw cutting surface 644 is set such that the material arranged between the punch side claw cutting surface 633 and the die side claw cutting surface 644 is cut off when the positioning claw portion 421 is formed by the claw forming punch 63 and the claw forming die 64.

The columnar piercing punch 61 is arranged on an outer peripheral side of the punched hole 684 formed in the lower unit 68. The piercing punch 61 is fixed to the lifting and lowering unit, and the piercing punch 61 and the holder unit 66 are arranged so as to be relatively movable.

When the through hole 411 formed in the cylinder member 1 and the positioning claw portion 421 are arranged on the opposite sides by an angle other than 180 degrees, a driving source is provided either in the piercing punch 61 and the piercing die 62 or in the claw forming punch and the claw forming die, thus forming both of the through hole 411 and the positioning claw portion 421.

Next, a manufacturing method of the cylinder member 1 using the first manufacturing device 5 and the second manufacturing device 6 configured as above will be explained.

First of all, as illustrated in FIG. 3, the material 100 (see FIG. 10A) formed into an annular shape by press working is mounted on the lower punch 57 of the first manufacturing device 5.

Figure 4:
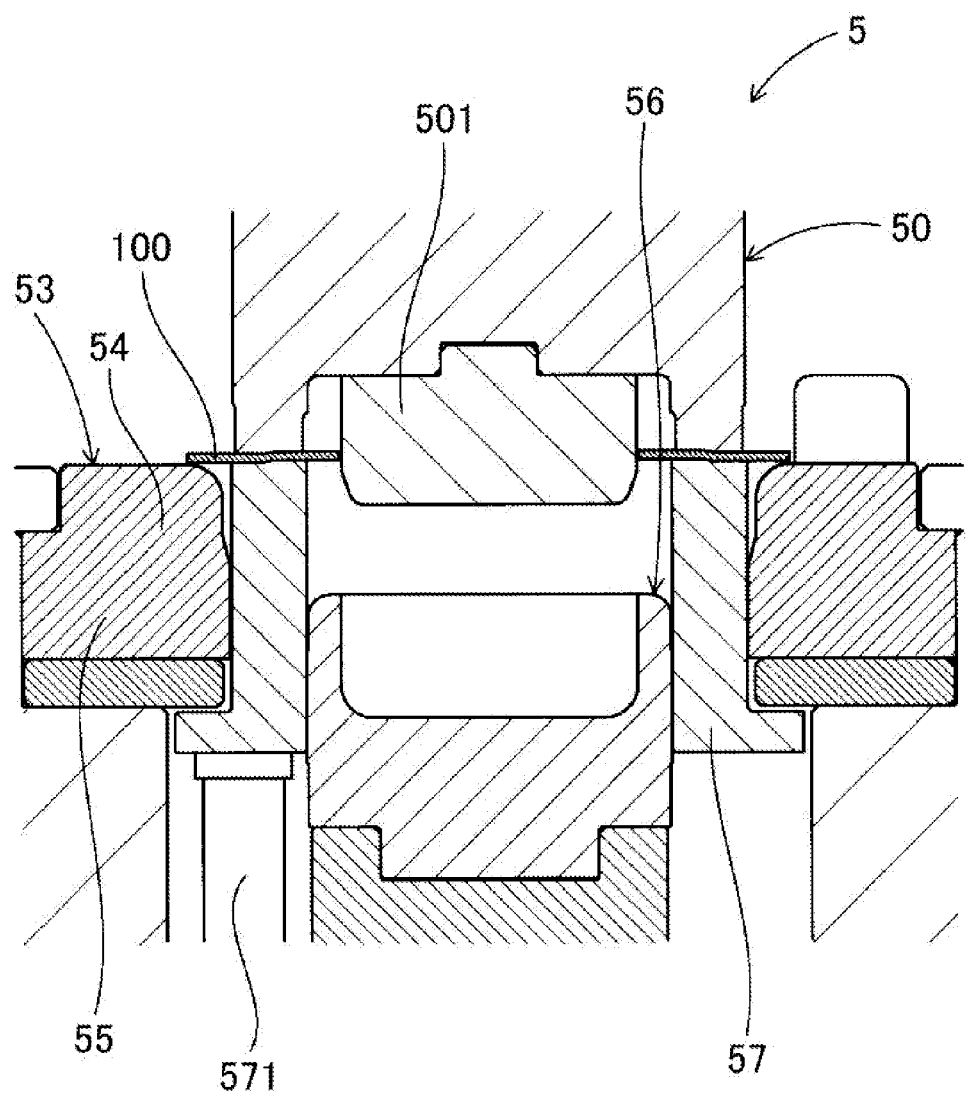
FIG. 4 is an explanatory view showing the first manufacturing device according to the first embodiment, in which a step portion is formed in the material.

Next, as shown in FIG. 4, the upper punch die 50 is moved down by the upper driving source of the single stroke press. At this time, the punch positioning portion 501 of the upper punch die 50 is inserted into the inner peripheral hole of the annular material 100 so as to position the material 100 in a radial direction.

Figure 10A:
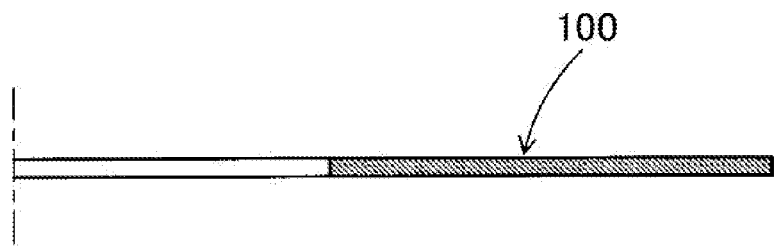
FIG. 10A is a sectional view showing the annular material according to the first embodiment.
Figure 10B:
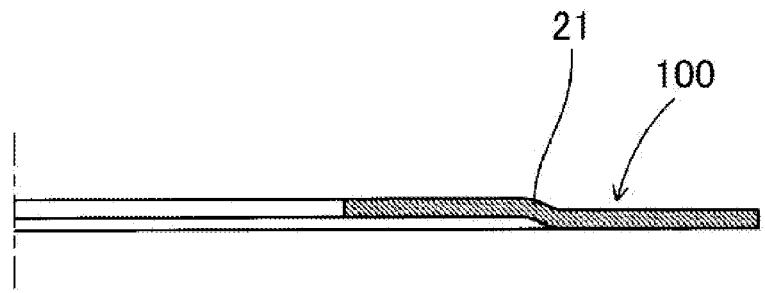
FIG. 10B is a sectional view showing the material in which the step portion is formed according to the first embodiment.

As shown in FIG. 4, once the upper punch die 50 is moved down further, the material 100 is held by the upper punch die 50 and the lower punch 57. As a result, as illustrated in FIG. 10B, the material 100 is deformed along a lower surface of the upper punch die 50 and the upper surface of the lower punch 57, thereby forming the step shape 21 in an area that forms the bottom face portion 2.

Next, a drawing step is conducted.

Figure 5:
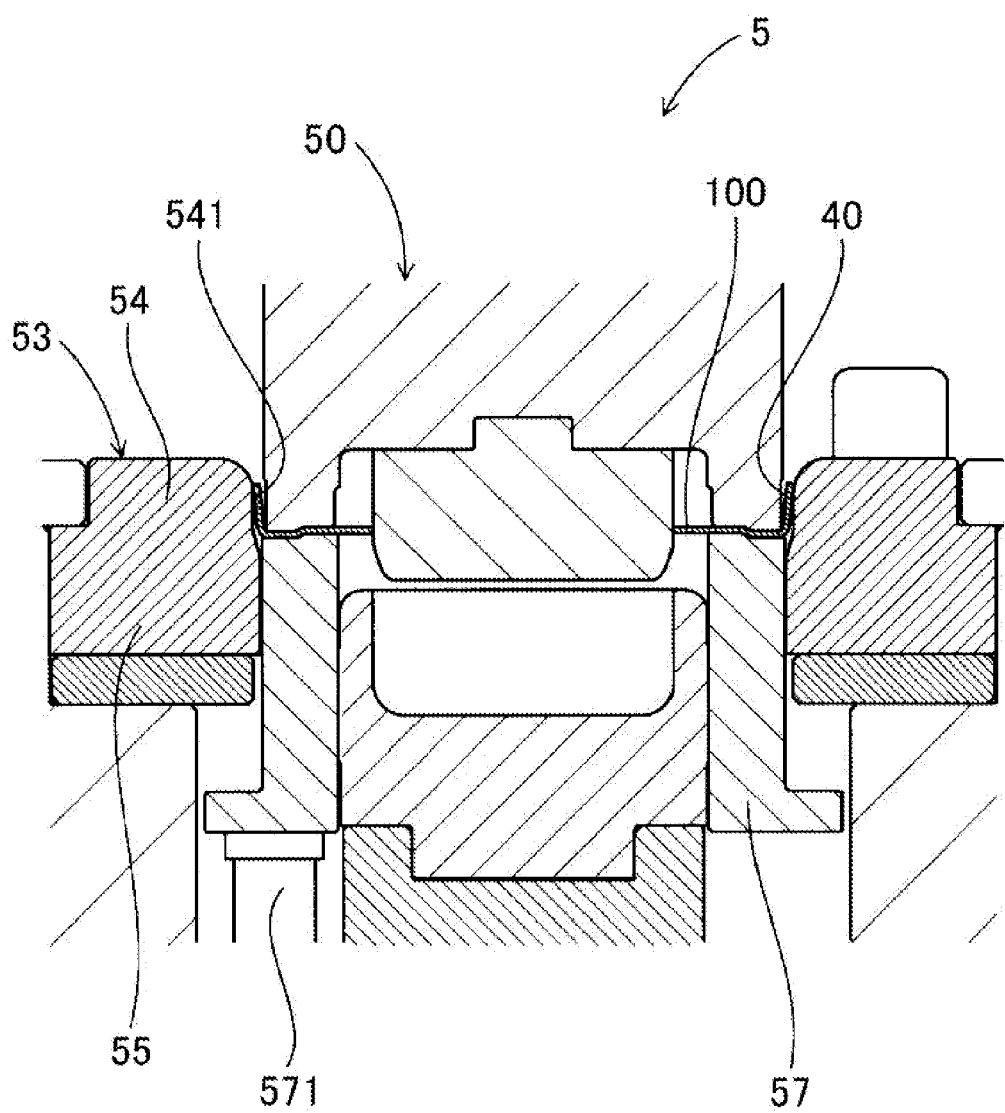
FIG. 5 is an explanatory view showing the first manufacturing device according to the first embodiment, when a drawing step is completed.
Figure 10C:
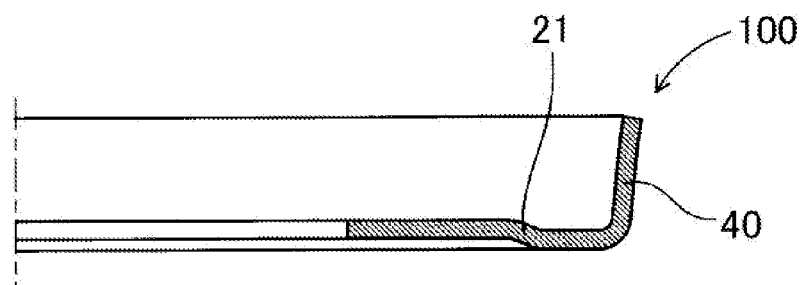
FIG. 10C is a sectional view showing the material after the drawing step is completed according to the first embodiment.

As illustrated in FIG. 5, the material 100 is moved down while being sandwiched between the upper punch die 50 and the lower punch 57, and is passed through the drawing hole 541 of the drawing die 54 of the combined die 53, thereby performing the drawing step. Accordingly, as illustrated in FIG. 10C, the cylindrical preliminary outer peripheral wall portion 40 projecting upwardly is formed in an area on the outer peripheral side of the material 100.

Then, an outer peripheral wall ironing step and an inner peripheral wall portion forming step are carried out.

Figure 6:
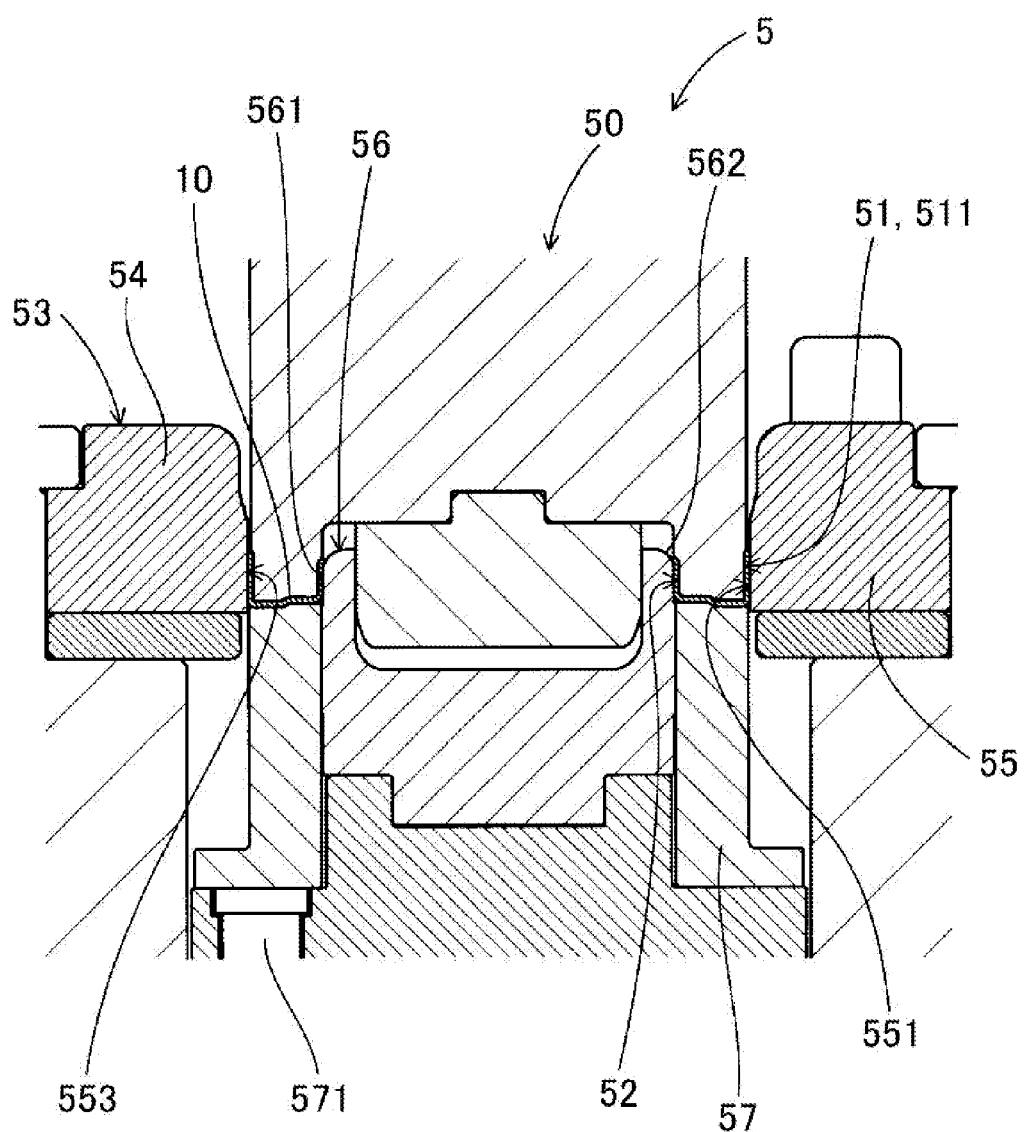
FIG. 6 is an explanatory view showing the first manufacturing device according to the first embodiment, when an ironing step and an inner peripheral wall portion forming step are completed.

As illustrated in FIG. 6, the material 100 is moved down while being sandwiched between the upper punch die 50 and the lower punch 57, and the outer peripheral wall portion ironing step and the inner peripheral wall portion forming step are carried out simultaneously.

Figure 10D:
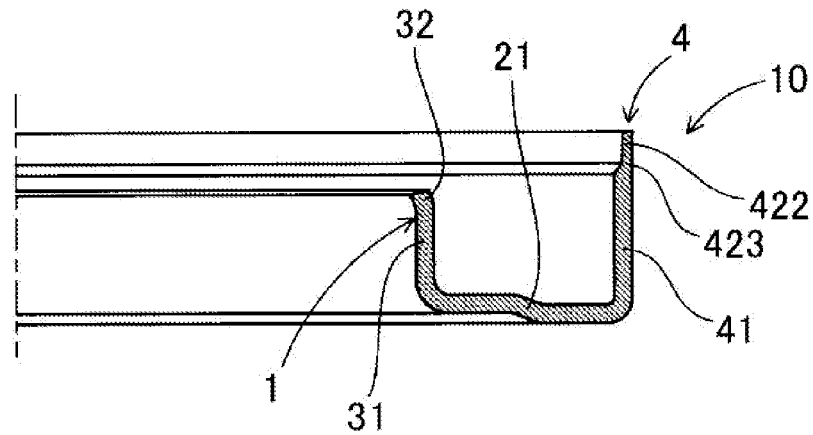
FIG. 10D is a sectional view showing the material after the ironing step and the inner peripheral wall portion forming step are completed according to the first embodiment.

In the outer peripheral wall ironing step, ironing is performed by the outer peripheral wall portion forming punch 51 formed by the outer peripheral surface of the upper punch die 50, and the outer peripheral wall portion forming die 55. The material of the preliminary outer peripheral wall portion 40 of the material 100 held between the upper punch die 50 and the lower punch 57 moves along the outer peripheral wall portion forming surface 511 of the outer peripheral wall portion forming punch 51 when passing through the ironing hole 551 of the outer peripheral wall portion forming die 55. Thus, as illustrated in FIG. 10D, the outer peripheral wall portion 4 having the outer peripheral constant portion 41, the diameter-increased straight portion 422, and the diameter changing portion 423 is formed.

As shown in FIG. 6, in the inner peripheral wall portion forming step, barring is carried out by the inner peripheral wall portion forming die 52 formed by the inner peripheral surface of the upper punch die 50, and the inner peripheral wall portion forming punch 56. A portion of the material 100 in vicinity of an inner peripheral edge of the material 100 projects upwardly while being pressed by the inner peripheral wall portion forming punch 56, and is deformed along the inner peripheral wall portion forming punch 56 and the inner peripheral wall portion forming die 52. Thus, as illustrated in FIG. 10D, the inner peripheral wall portion 3 is formed, which includes the cylindrical inner peripheral constant portion 31 projecting upwardly, and the inner peripheral introducing portion 32 of which the diameter is reduced upwardly from the distal end of the inner peripheral constant portion 31.

Further, as described above, by forming the outer peripheral wall portion 4 and the inner peripheral wall portion 3, the bottom face portion 2 connecting the outer peripheral wall portion 4 and the inner peripheral wall portion 3 and having the step shape is formed on base end sides of the outer peripheral wall portion 4 and the inner peripheral wall portion 3.

Next, the positioning claw portion 421 and the through hole 411 are formed by the second manufacturing device 6.

In this embodiment, a claw forming step for forming the positioning claw portion 421 and a punching step for forming the through hole 411 are carried out simultaneously.

As illustrated in FIG. 11, the preliminary cylinder member 10 having the bottom face portion 2, the inner peripheral wall portion 3, and the outer peripheral wall portion 4 that are formed by the first manufacturing device 5, is placed between the upper unit 67 and the lower unit 68 of the holder unit 66.

As illustrated in FIG. 12, in the claw forming step, the slide block 65 provided in the lifting and lowering unit is moved down, thereby allowing the claw forming die 64 to move toward the holder unit 66. The claw forming die 64 is moved further even after the claw forming die 64 comes into contact with the holder unit 66, thereby moving the holder unit 66 holding the preliminary cylinder member 10 toward the piecing punch 61. As opposed to the movement of the holder unit 66 and the claw forming die 64, the claw forming punch 63 moves toward the claw forming die 64, and the positioning claw portion 421 is formed by the claw forming punch 63 and the claw forming die 64.

As shown in FIG. 12, in the punching step, the holder unit 66 moves toward the piercing punch 61 in accordance with the movement of the claw forming die 64 in the claw forming step. As a result, the through hole 411 is formed by the piercing punch 61, and the punched hole 684 of the holder unit 66, which forms the piercing die 62.

Thus, the cylinder member of the automatic transmission is completed.

Next, effects of this embodiment will be described.

The cylinder member 1 of the automatic transmission includes the outer peripheral introducing portion 42 having the inner peripheral surface of the diameter-increased straight portion 422 and the diameter changing portion 423 configured as described above. The shape of the outer peripheral introducing portion 42 is able to be formed by ironing without forming and cutting off a flange portion that was conventionally required for forming the outer peripheral introducing portion 42. Therefore, steps required for forming the flange portion are omitted, thereby reducing the number of steps for manufacturing the cylinder member 1. Hence, without using a large-scale press machine such as a progressive press and a transfer press, the cylinder member 1 is manufactured by a smaller-sized press machine. Thus, equipment investment required for manufacturing the cylinder member 1 is reduced.

Further, as described earlier, since the flange portion is not trimmed off, deformation of the outer peripheral wall portion 4 due to trimming of the flange portion is suppressed, thereby preventing deterioration of diametric accuracy of the outer peripheral wall portion 4. Hence, without modifying the shape of the outer peripheral wall portion 4, the outer peripheral wall portion 4 with high diametric accuracy is formed, thereby improving productivity of the cylinder member 1.

In the cylinder member 1 of the automatic transmission, the inner peripheral introducing portion 32 is formed of a curved surface having a generally arc-shaped section. Therefore, the inner peripheral introducing portion 32 is easily formed by barring, together with the inner peripheral wall portion 3.

Moreover, the positioning claw portion 421 is formed by bending a part of a distal end portion of the diameter-increased straight portion 422 to the outer peripheral side. Thus, the positioning claw portion is formed easily by a cutting and raising work.

The manufacturing method of the cylinder member of an automatic transmission includes the drawing step, the outer peripheral wall portion ironing step, the inner peripheral wall portion forming step, the punching step, and the claw forming step. Thus, the above-described excellent cylinder member 1 of the automatic transmission is obtained easily.

Also, the inner peripheral wall portion forming punch 56 has the punch curved surface portion 562 corresponding to the inner peripheral shape of the inner peripheral introducing portion 32, and the inner peripheral wall portion forming die 52 has the die curved surface portion 523 corresponding to the outer peripheral shape of the inner peripheral introducing portion 32. The inner peripheral introducing portion 32 is formed by barring in the inner peripheral wall portion forming step. Hence, by performing the barring by using the inner peripheral wall portion forming punch 56 and the inner peripheral wall portion forming die 52 configured as described above, the inner peripheral introducing portion 32 is easily formed together with the inner peripheral wall portion 3.

Moreover, the positioning claw portion 421 is formed by a cutting and raising work conducted by the claw forming punch 63 and the claw forming die 64, whereby a part of a distal end portion of the diameter-increased straight portion 422 is bent to the outer peripheral side. Therefore, the positioning claw portion 421 is easily formed while reducing an influence of forming of the positioning claw portion 421 on the diametric accuracy of the outer peripheral wall portion 4.

Further, the through hole 411 of the cylinder member 1 is formed in the outer peripheral constant portion 41 on a side opposite to a side where the positioning claw portion 421 projects by 180 degrees. The through hole 411 is formed by moving the piercing punch 61 relative to the piercing die 62 by using the relative movement of the claw forming punch 63 and the claw forming die 64 which form the positioning claw portion 421. Hence, the relative movement of the claw forming punch 63 and the claw forming die 64, and the relative movement of the piercing punch 61 and the piercing die 62 are made by a single driving source. Accordingly, the equipment investment required for manufacturing the cylinder member 1 is reduced.

According to this embodiment, the cylinder member 1 of the automatic transmission is provided, which has high diametric accuracy and enables reduction of the number of manufacturing steps and downsizing of a press machine. The cylinder member manufacturing method by which the cylinder member 1 is easily obtained is also provided.

What is claimed is:

1. A manufacturing method of a cylinder member of an automatic transmission, wherein the cylinder member includes an annular bottom face portion, a cylindrical inner peripheral wall portion projecting upright from an inner peripheral edge of the bottom face portion, and a cylindrical outer peripheral wall portion projecting upright from an outer peripheral edge of the bottom face portion, the inner peripheral wall portion has an inner peripheral constant portion having a constant outer diameter, and has an inner peripheral introducing portion on a distal end of the inner peripheral wall portion, the inner peripheral introducing portion having an outer diameter smaller than the outer diameter of the inner peripheral constant portion, the outer peripheral wall portion has an outer peripheral constant portion having a constant inner diameter, and has an outer peripheral introducing portion on a distal end of the outer peripheral wall portion, the outer peripheral introducing portion having an inner diameter larger than the inner diameter of the outer peripheral constant portion, the outer peripheral constant portion has a through hole that communicates between an inner peripheral side and an outer peripheral side, and a positioning claw portion is provided at least one position of the outer peripheral introducing portion in a circumferential direction and projects to the outer peripheral side, the manufacturing method comprising:

a drawing step in which a cylindrical preliminary outer peripheral wall portion is formed by projecting upright an outer peripheral side of an annular material;

an outer peripheral wall portion ironing step in which ironing is carried out for forming the preliminary outer peripheral wall portion into the outer peripheral wall portion by an outer peripheral wall portion forming punch and an outer peripheral wall forming die, the outer peripheral wall portion forming punch having an outer peripheral wall portion forming surface provided on an outer peripheral surface of the outer peripheral wall portion forming punch and corresponding to an inner peripheral shape of the outer peripheral wall portion, and the outer peripheral wall forming die having an ironing hole corresponding an outer peripheral shape of the outer peripheral wall portion;

an inner peripheral wall portion forming step in which the inner peripheral wall portion is formed by an inner peripheral wall portion forming punch and an inner peripheral wall portion forming die, the inner peripheral wall portion forming punch having an inner peripheral wall portion forming surface provided on an outer peripheral surface of the inner peripheral wall portion forming punch and corresponding to an inner peripheral shape of the inner peripheral wall portion, and the inner peripheral wall portion forming die having an inner peripheral wall portion forming hole corresponding to an outer peripheral shape of the inner peripheral wall portion;

a punching step in which the through hole is formed by a piercing punch arranged at a position corresponding to the through hole, and a piercing die having a punched hole corresponding to the piercing punch; and a claw forming step in which the positioning claw portion is formed by a claw forming punch arranged at a position corresponding to the positioning claw portion on an inner peripheral side of the outer peripheral wall portion, and a claw forming die having a recessed portion corresponding to the claw forming punch, wherein, in the outer peripheral wall portion ironing step, the outer peripheral introducing portion is formed, the outer peripheral introducing portion including an diameter-increased straight portion having a constant inner diameter that is larger than the inner diameter of the outer peripheral constant portion, and an diameter changing portion which smoothly connects the diameter-increased straight portion and the outer peripheral constant portion.

2. The manufacturing method of a cylinder member of an automatic transmission according to claim 1, wherein:

the inner peripheral introducing portion is formed by a curved surface having a generally arc-shaped section;

the inner peripheral wall portion forming punch has a punch curved surface portion corresponding to an inner peripheral shape of the inner peripheral introducing portion;

the inner peripheral wall portion forming die has a die curved surface portion corresponding to an outer peripheral shape of the inner peripheral introducing portion; and the inner peripheral introducing portion is formed by barring in the inner peripheral wall portion forming step.

3. The manufacturing method of a cylinder member of an automatic transmission according to claim 1, wherein the positioning claw portion is formed by a cutting and raising work conducted by the claw forming punch and the claw forming die, in which a part of a distal end portion of the diameter-increased straight portion is bent to the outer peripheral side.

4. The manufacturing method of a cylinder member of an automatic transmission according to claim 2, wherein the positioning claw portion is formed by a cutting and raising work conducted by the claw forming punch and the claw forming die, in which a part of a distal end portion of the diameter-increased straight portion is bent to the outer peripheral side.

5. The manufacturing method of a cylinder member of an automatic transmission according to claim 1, wherein:

the through hole of the cylinder member is formed in the outer peripheral constant portion on a side opposite to a side where the positioning claw portion projects by 180 degrees; and the piercing punch is moved relative to the piercing die by moving the claw forming punch relative to the claw forming die when forming the positioning claw portion to form the through hole.

6. The manufacturing method of a cylinder member of an automatic transmission according to claim 2, wherein:

the through hole of the cylinder member is formed in the outer peripheral constant portion on a side opposite to a side where the positioning claw portion projects by 180 degrees; and the piercing punch is moved relative to the piercing die by moving the claw forming punch relative to the claw forming die when forming the positioning claw portion to form the through hole.

7. The manufacturing method of a cylinder member of an automatic transmission according to claim 3, wherein:

the through hole of the cylinder member is formed in the outer peripheral constant portion on a side opposite to a side where the positioning claw portion projects by 180 degrees; and the piercing punch is moved relative to the piercing die by moving the claw forming punch relative to the claw forming die when forming the positioning claw portion to form the through hole.

8. The manufacturing method of a cylinder member of an automatic transmission according to claim 4, wherein:

the through hole of the cylinder member is formed in the outer peripheral constant portion on a side opposite to a side where the positioning claw portion projects by 180 degrees; and the piercing punch is moved relative to the piercing die by moving the claw forming punch relative to the claw forming die when forming the positioning claw portion to form the through hole.

* * * * *